Figure 6:
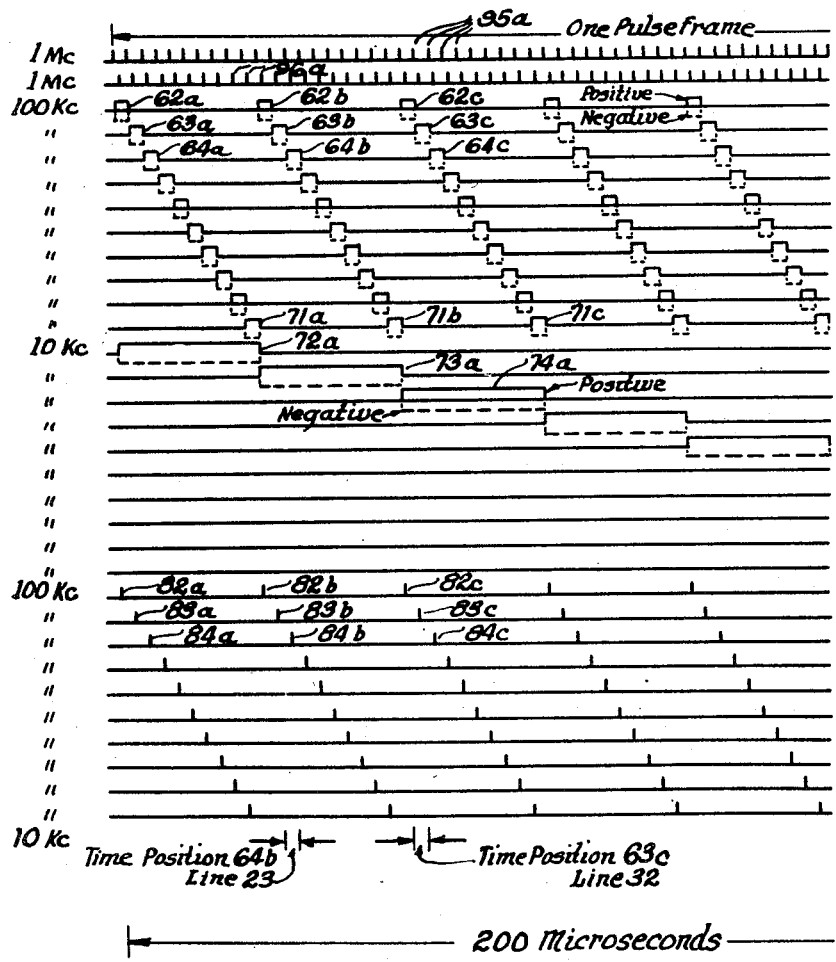

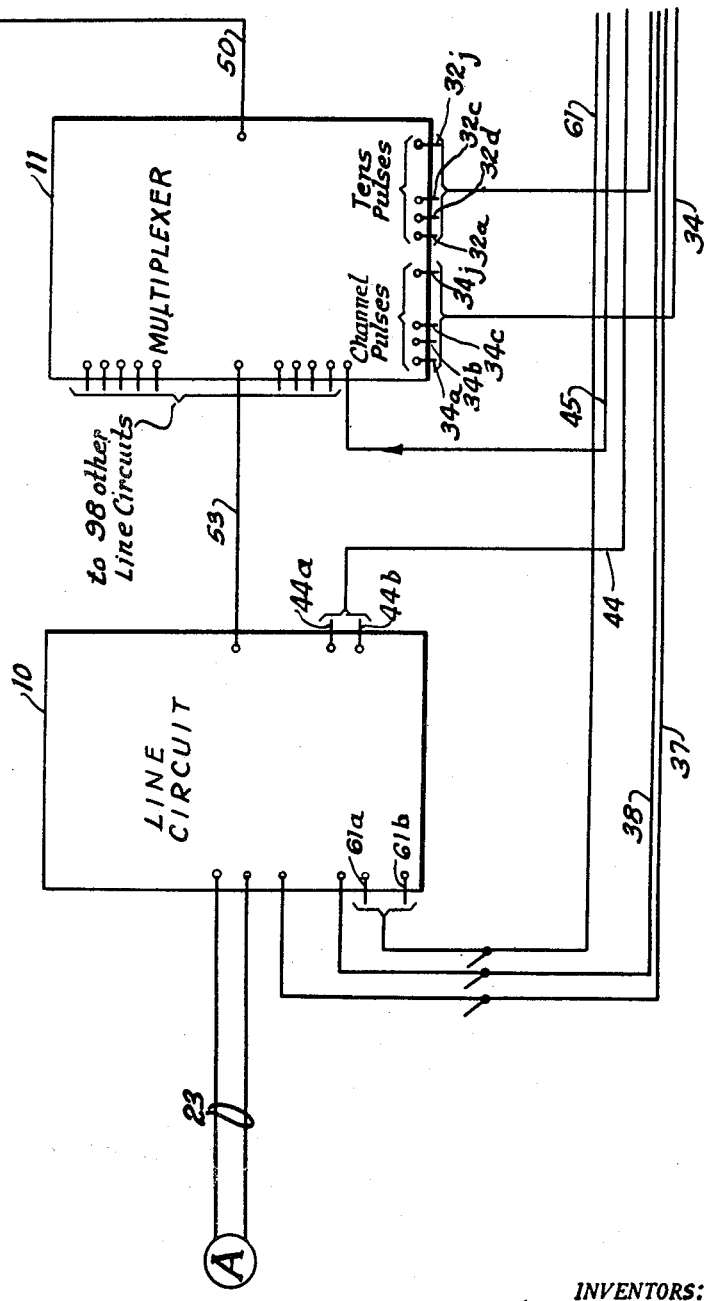

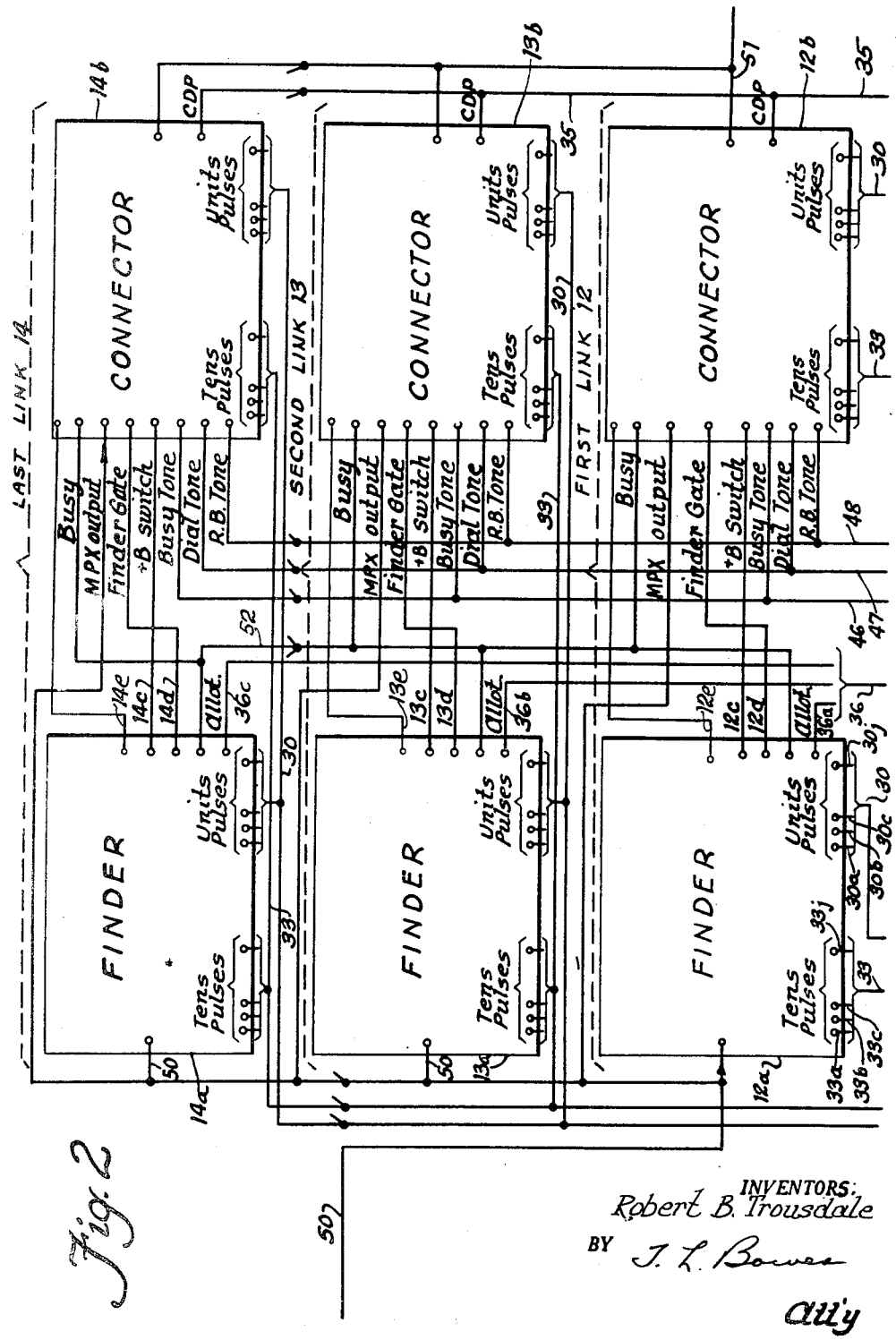

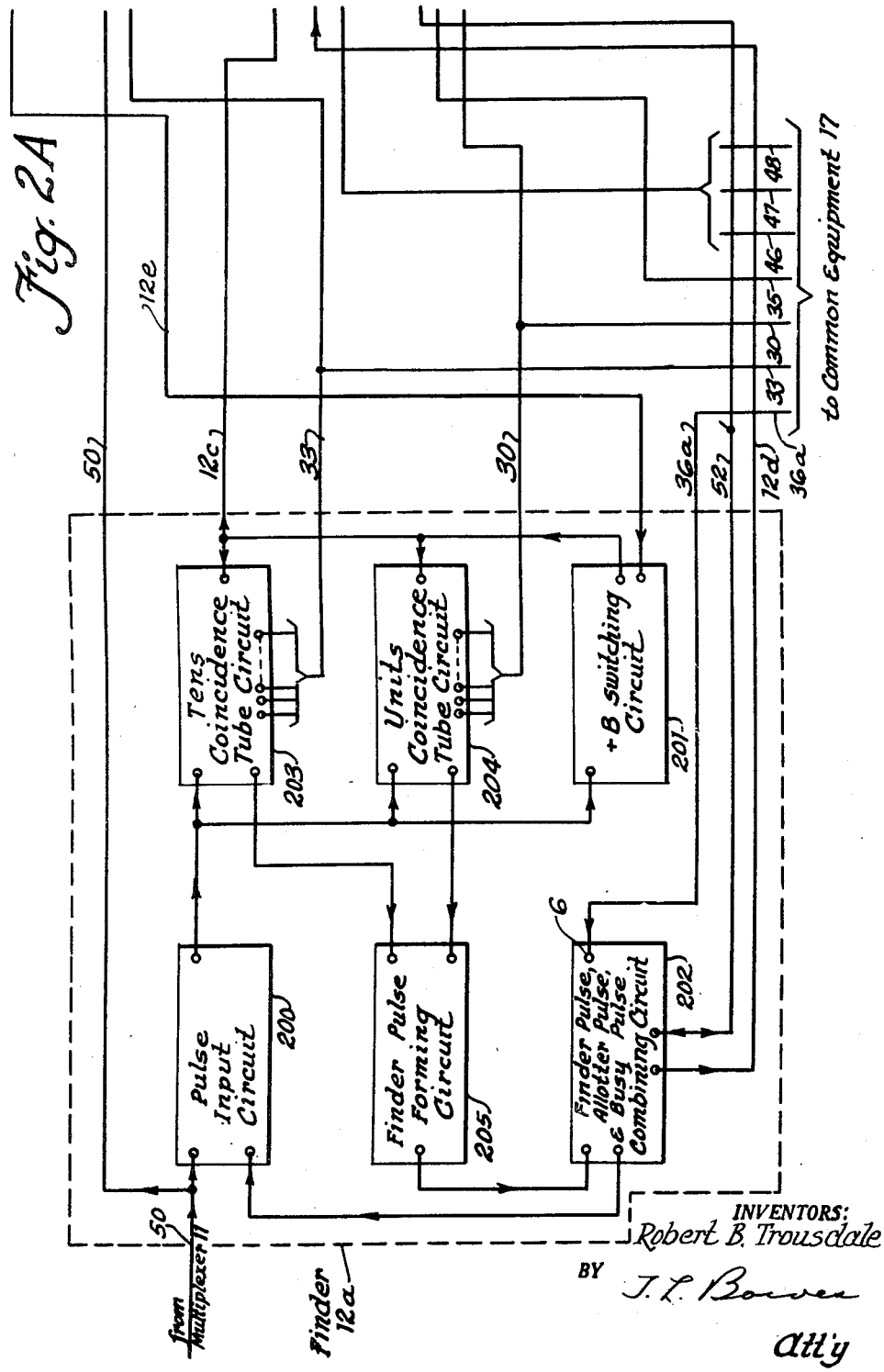

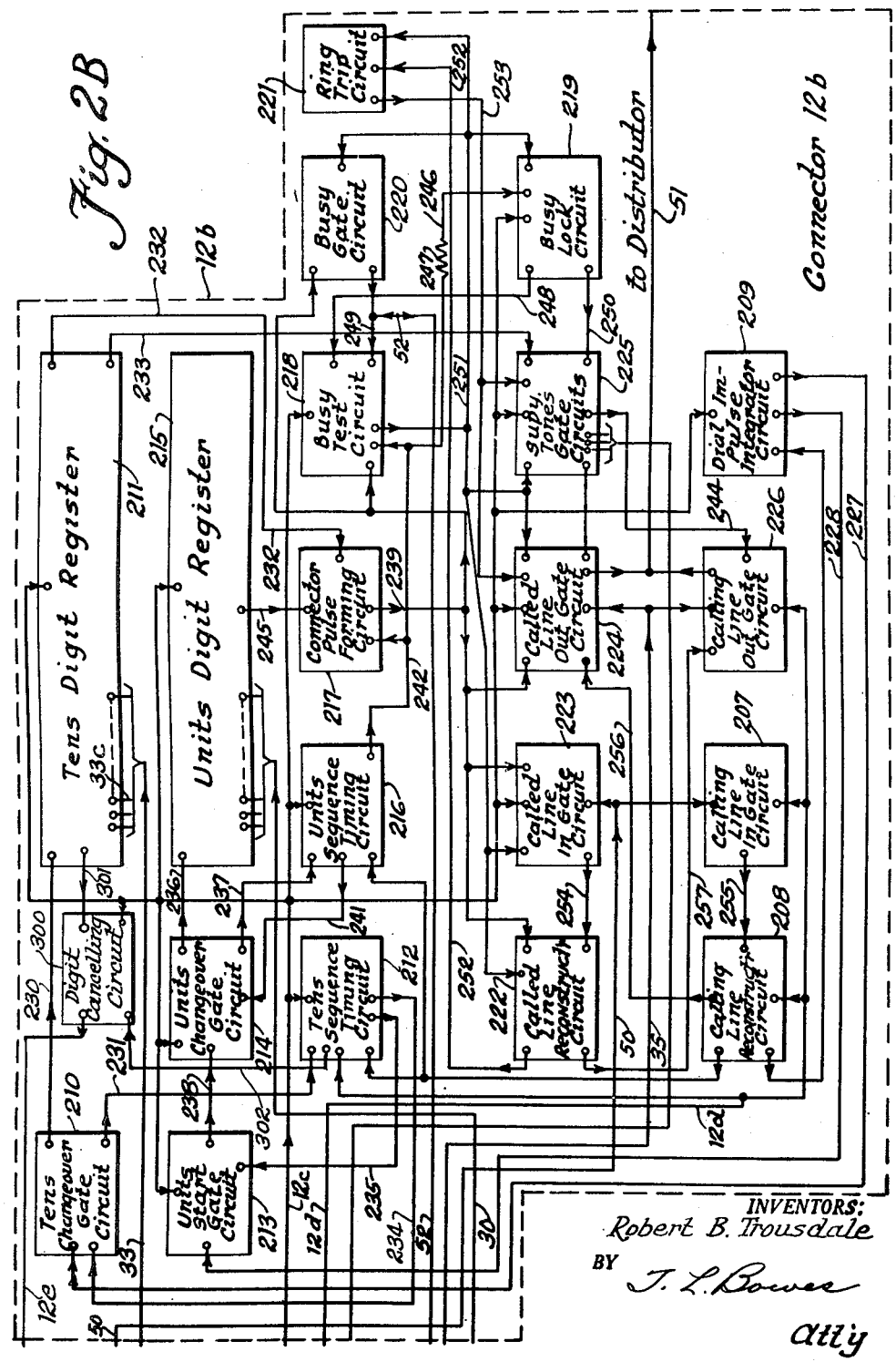

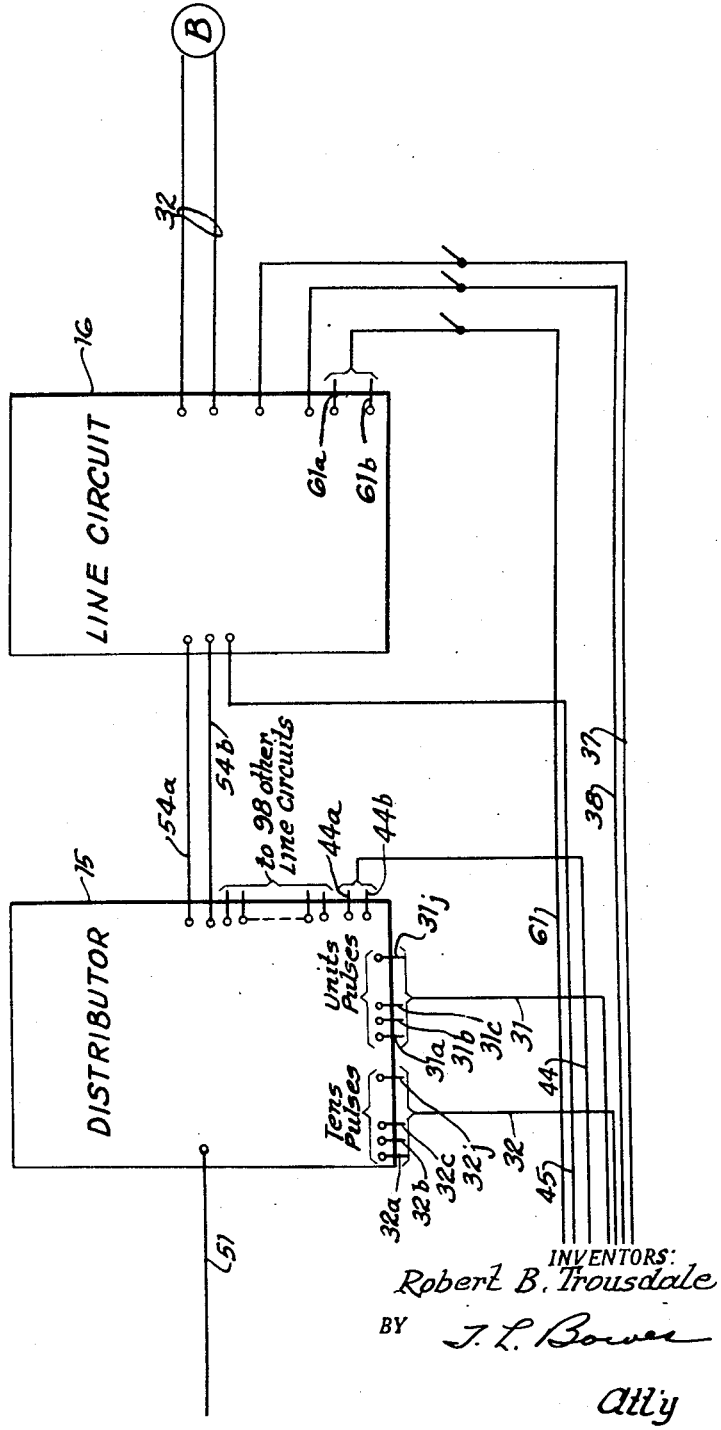

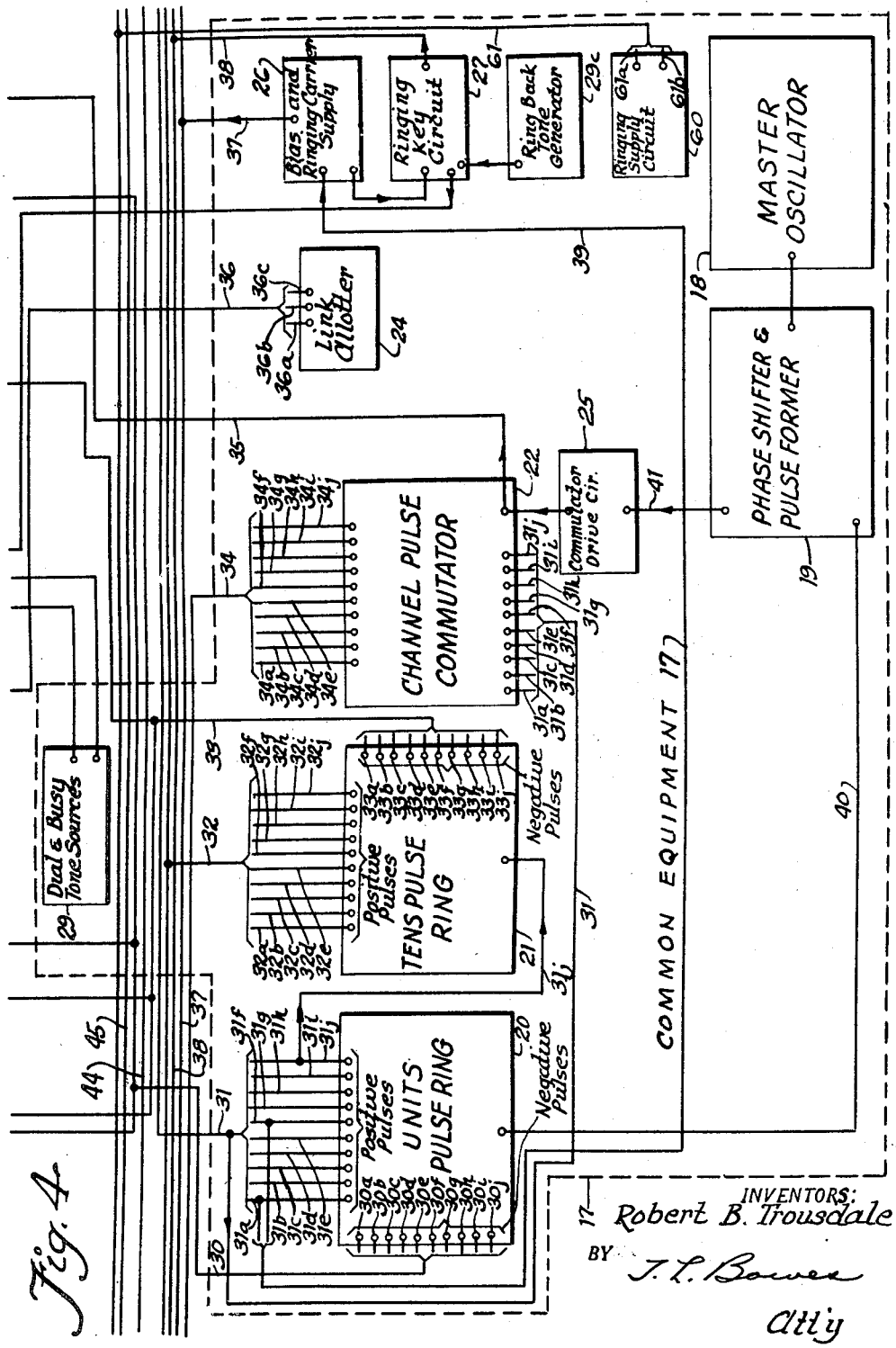

Nov. 16, 1954  R. B. TROUSDALE  2,694,750
DIGIT CANCELING SYSTEM
Filed Aug. 4, 1950  11 Sheets-Sheet 7
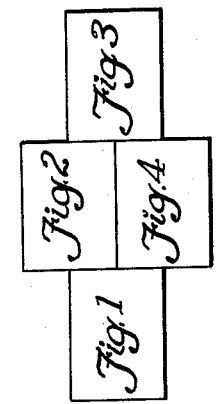
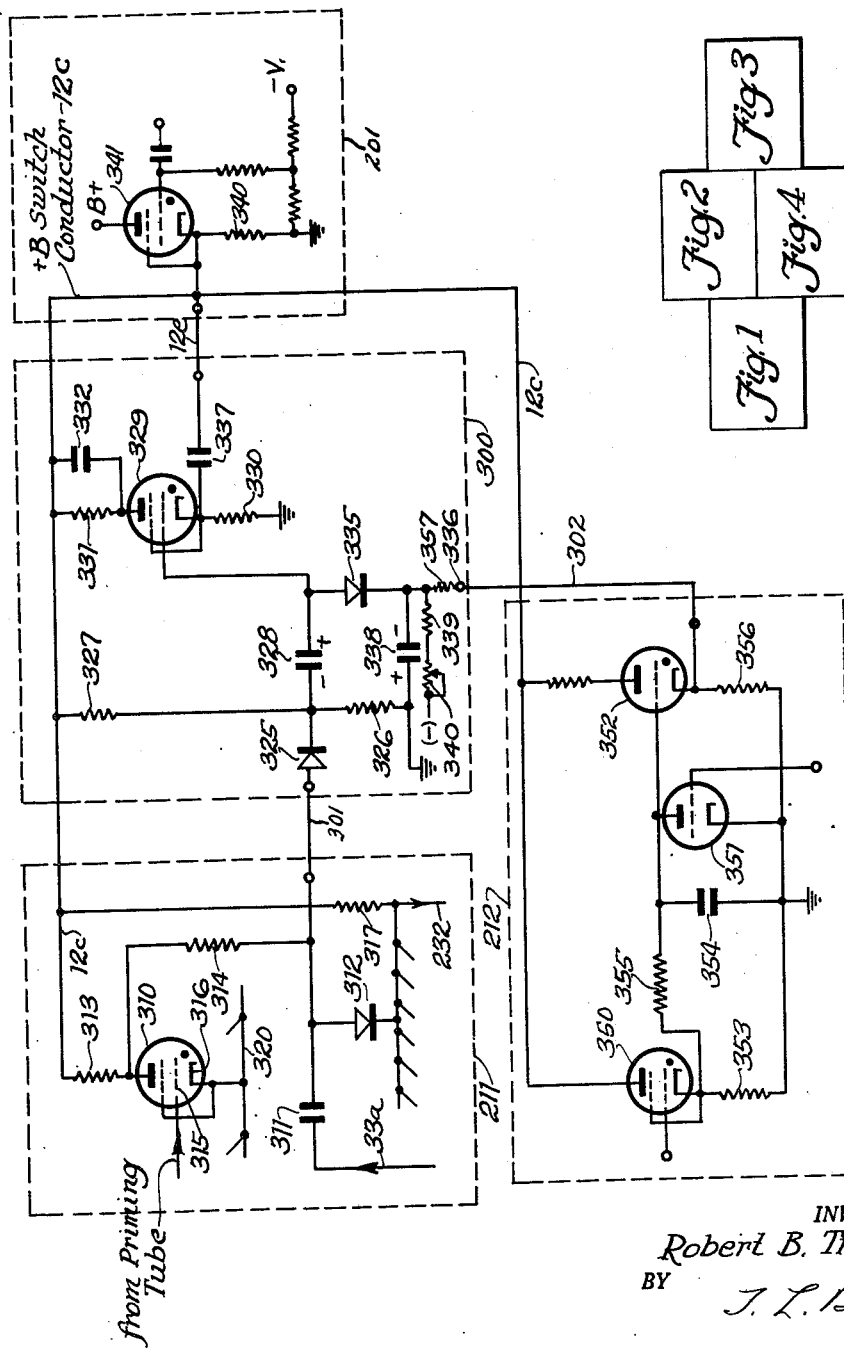
INVENTOR.
Robert B. Trousdale
BY J. L. Bower
Att'y Nov. 16, 1954

R. B. TROUSDALE 2,694,750

DIGIT CANCELING SYSTEM

Filed Aug. 4, 1950

11 Sheets-Sheet 9

INVENTORS:
Robert B. Trousdale
BY J. L. Bower
att'y

Nov. 16, 1954  R. B. TROUSDALE  2,694,750
DIGIT CANCELING SYSTEM
Filed Aug. 4, 1950  11 Sheets-Sheet 11

INVENTORS:
Robert B. Trousdale
BY
J. L. Bower
Att'y

United States Patent Office 2,694,750
Patented Nov. 16, 1954

2,694,750

DIGIT CANCELING SYSTEM

Robert B. Trousdale, Rochester, N. Y., assignor to Stromberg-Carlson Company, a corporation of New York Application August 4, 1950, Serial No. 177,704

24 Claims. (Cl. 179—16)

The present invention relates to automatic telephone systems and more particularly to an improved digit cancelling arrangement for use in an automatic telephone system. Specifically, the digit cancelling system of the present invention is adapted for use in an electronic telephone system of the improved form described and claimed in co-pending application, Serial No. 134,974, Frank A. Morris and Robert B. Trousdale, filed December 24, 1949, and assigned to the same assignee as the present invention.

In a telephone system of the automatic type, it is impossible to distinguish between a momentary depression of the switchhook, commonly called a switchhook "flub," and the dial impulse which results from dialing the first digit "1" of a desired telephone number. To solve this problem, most automatic telephone systems of the electro-mechanical type employ digit absorbing circuits in which a first digit of "1" is always absorbed, the purpose being to prevent inadvertent switchhook "flubs" from producing false calls. However, digit absorbing systems of this type are designed specifically for electro-mechanical systems and are entirely unsuitable for operation with an electronic telephone system of the improved form disclosed in the copending application referred to above.

Accordingly, it is an object of the present invention to provide a new and improved digit cancelling arrangement for automatic telephone systems.

It is another object of the present invention to provide a digit cancelling arrangement which is particularly adapted for use in an electronic telephone system.

It is a further object of the present invention to provide a new and improved digit cancelling system for an electronic telephone system in which a particular link occupied with a call is rendered non-responsive to dial impulses when the first digit transmitted thereto comprises a single impulse.

It is a still further object of the present invention to provide a new and improved digit cancelling system for an electronic telephone system in which only the transmission of a first digit "1" to a particular link causes the link to be non-receptive to further digits and the dialing of other first digits having more than one impulse causes the link to respond in the normal manner.

Figure 7:
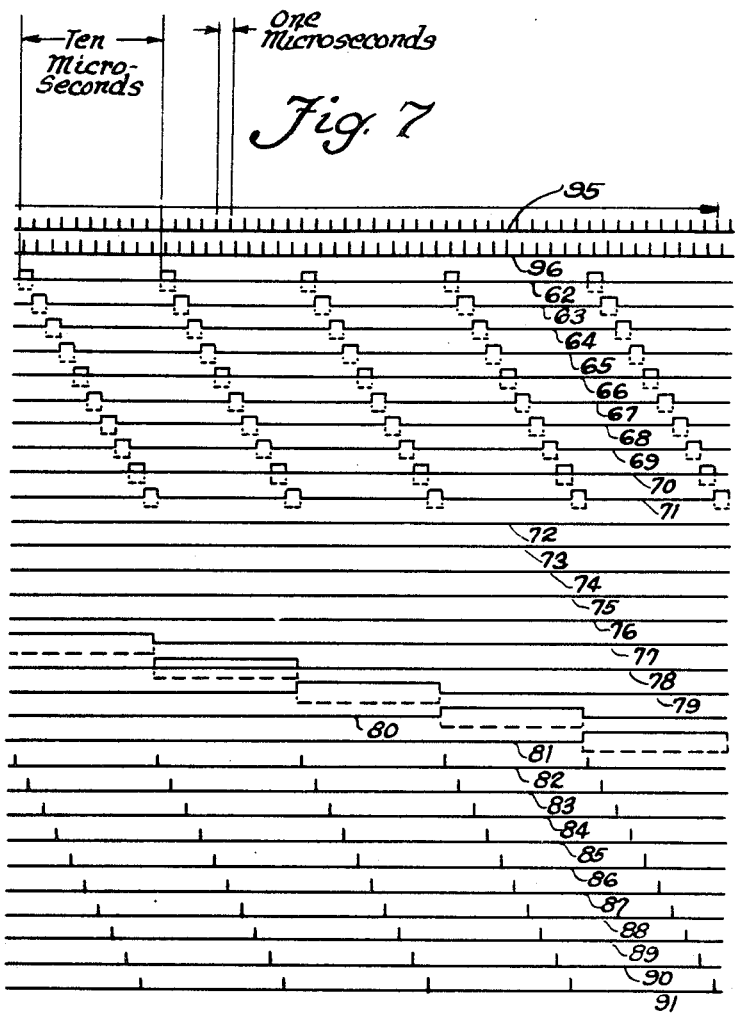
Figure 8:
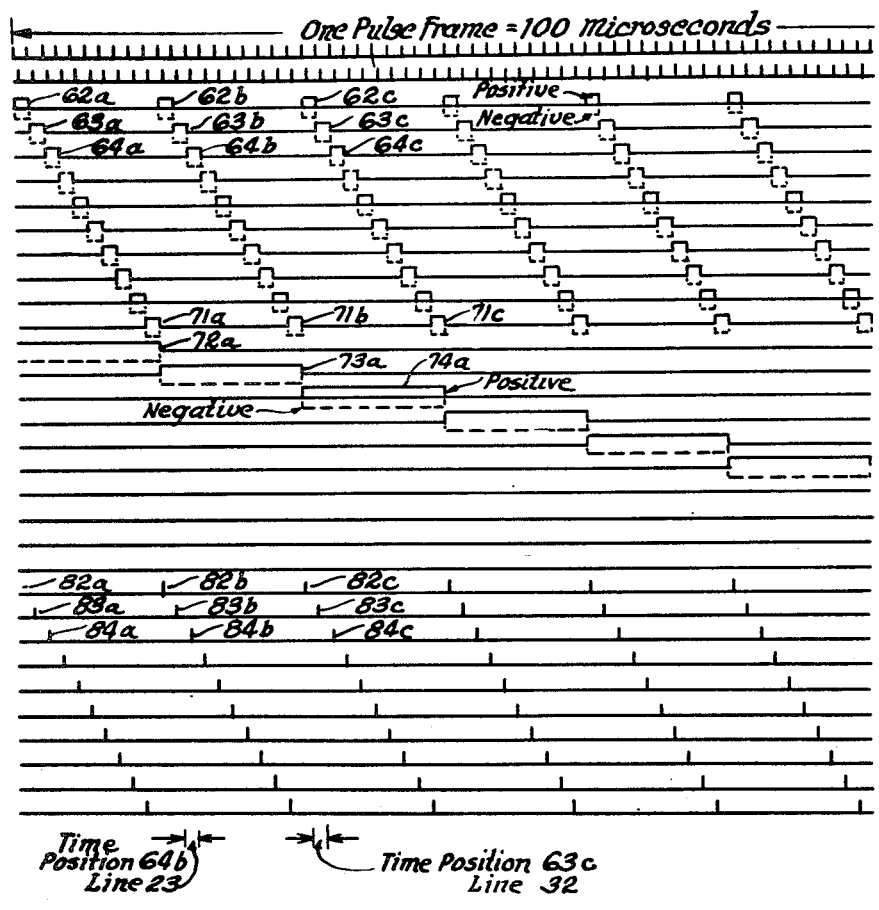
Figure 9:
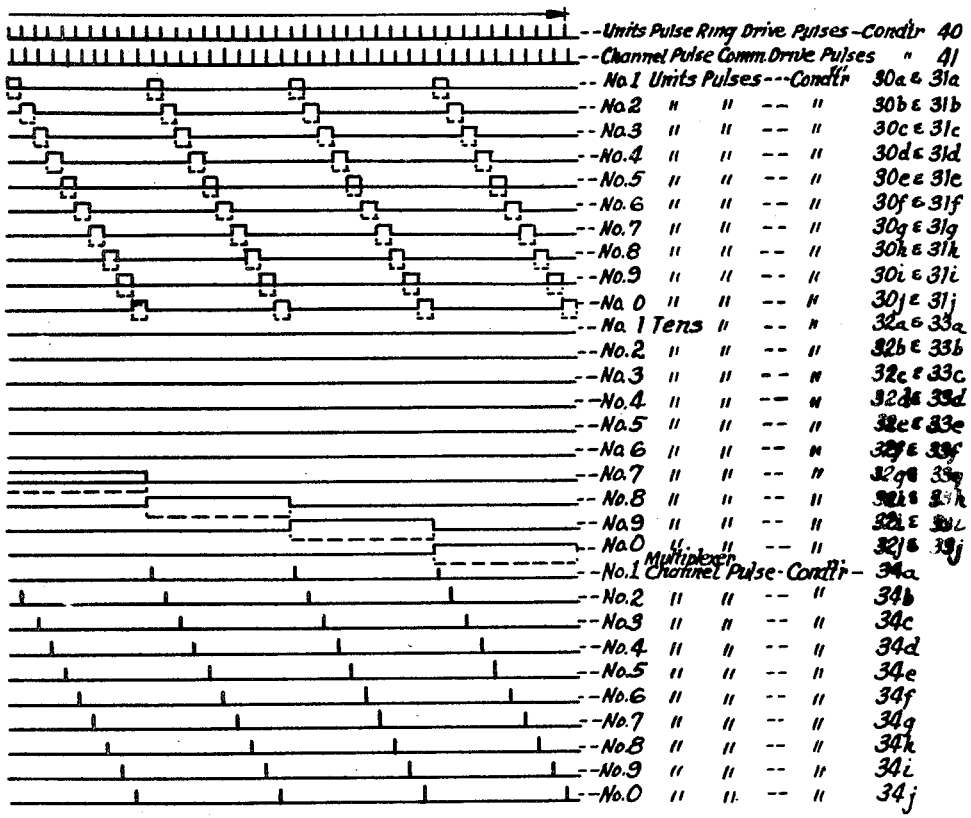

The invention, both as to its organization and method of operation, together with further objects and advantages thereof, will best be understood by reference to the following specification taken in connection with the accompanying drawings, in which:

Figs. 1, 2, 3, and 4, when arranged in the manner shown in Fig. 5, diagrammatically illustrate an electronic telephone system embodying digit cancelling facilities characterized by the features of the present invention;

Figs. 2A and 2B, when laid end to end in the order named, diagrammatically illustrate the component circuits, including the digit cancelling system of the present invention, of one of the finder connector links of the system shown in Figs. 1 to 4, inclusive;

Figs. 6, 7, 8, and 9, when laid side by side in the order named, graphically illustrate the time relationships between certain of the pulses developed by and utilized in the various component circuits of the system shown in Figs. 1 to 4 inclusive; and Fig. 10 illustrates the details of the digit cancelling facilities embodied in the link shown in Figs. 2A and 2B.

The digit cancelling system of the present invention is adapted for use in a fully automatic electronic telephone system of the type described in the copending application, Serial No. 134,974, referred to above. For a complete and detailed description of the entire system, reference may be had to the above-identified application. However, for the purposes of the present disclosure, the system is illustrated generally in Figs. 1, 2, 3, and 4 of the drawings as comprising line circuits 10, 16, etc., individual to the one hundred lines of the system, a multiplexer 11 of which only one is required in the system, a plurality of identical finder-connector links 12, 13 and 14, a distributor 15 of which only one is required in the system, and the common equipment indicated generally at 17 in Fig. 4 of the drawings. Each of the finder-connector links is comprised of a finder and a connector, the illustrated links respectively comprising finders 12a, 13a and 14a and connectors 12b, 13b and 14b. It will be understood that the number of finder-connector links employed in the system may be chosen as required to handle the traffic. Although only three links 12, 13 and 14 have been illustrated, from seven to ten links will normally be required in actual practice to handle the traffic of a one hundred line exchange. Inclusion of the additional links in the system may easily be accomplished by connecting appropriate terminals of additional links to the indicated multiple points. Actually, only twenty-seven multiple connections and one individual connection are required in order to add one finder-connector link to the system. This is in contrast with conventional step-by-step and all-relay type systems wherein more than six hundred multiple connections are normally required to put a single added link into service.

As shown, the line circuits 10 and 16 respectively terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors 12b, 13b, or 14b by way of the distributor 15 to transmit ringing current to the associated substation on a call incoming thereto. To perform these functions, the line circuit 10 is connected by way of a conductor 53 to one of the gate circuits provided in the multiplexer 11, and is connected by way of the conductors 44a and 44b forming the illustrated cable 44 to one of the gate circuits provided in the distributor 16. The line circuit 10 is also connected to certain components of the common equipment 17 in the manner described below. Similarly, the line circuit 16 is connected by way of the conductors 54a and 54b to one of the gate circuits in the distributor 15 and by way of the conductor 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders 12a, 13a, and 14a and also to the multiplexer input terminals of each of the connectors 12b, 13b and 14b. In reverse manner, the distributor 15 performs the function of repeating intelligence and control signals derived from the connectors 12b, 13b, and 14b in time positions corresponding to particular calling and called lines to the line circuits respectively terminating the lines. To this end, the input terminals of the distributor are connected by way of the common conductor 51 to the output terminals of each of the connectors 12b, 13b and 14b. In performing the described functions, the multiplexer 11 and the distributor 15 are controlled by certain components of the common equipment 17 in the manner hereinafter explained.

The finders of the various links, such as, for example, the finder 12a, do not perform any intelligence transmission functions. On the contrary, they function strictly as control units. Specifically, the finder 12a is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12b. To advise the connector of the pulse time position assigned to the calling line, the finder 12a transmits finder gate pulses to the connector in this pulse time position over the conductor 12d. The finder 12a also performs the function of conditioning its associated connector 12b for operation when the link 12 is definitely associated with a calling line to handle the call initiated on the line. This is accomplished through operation of the finder 12a to impress operating anode potentials upon a plurality of the tubes in the connector 12b over the +B switch conductor 12c. When operatively associated with a particular calling line, the finder 12a also performs the function of guarding the calling line against intrusion on an incoming call to the line. This is accomplished through operation of the finder 12a to feed busy pulses occurring in the particular pulse time position assigned to the calling line with which the finder is operatively associated to a common busy conductor 52 which is multiplied to each of the finders and connectors of the system. To perform the above functions, the finder 12a comprises (see Fig. 2A) a pulse input circuit 200, a +B switching circuit 201, a pulse combining circuit 202, tens and units coincidence tube circuits 203 and 204, and a finder pulse forming circuit 205. It will be noted that the finder 12a and connector 12b are connected on an individual link basis by only three conductors, namely the +B switch conductor 12c, finder gate pulse conductor 12d and the digit cancelling conductor 12e. The finder 13a and connector 13b of the link 13 are similarly connected on an individual link basis by means of the conductors 13c, 13d and 13e which respectively correspond to the conductors 12c, 12d and 12e of the link 12. Similarly, the digit cancelling, finder gate and +B switch conductors 14e, 14d and 14c are provided to connect the finder 14a and connector 14b of the link 14.

Each of the connectors 12b, 13b and 14b performs a plurality of different functions. Thus, the connector 12b, for example, is controlled by finder gate pulses delivered thereto over the conductor 12d to accept and respond to signal bearing multiplexer pulses occurring in the pulse time position corresponding to the calling line with which the link is associated. It also responds to the application of operating anode potential to the conductor 12c and to the finder gate pulses appearing on the conductor 12d to feed a dial tone signal to the distributor 15 on connector signal pulses occurring in the pulse time position assigned to the calling line with which it is operatively associated, thereby to return the usual dial tone signal to the calling subscriber. It also distinguishes between a first digit consisting of two or more impulses and a first digit comprising a single impulse, and is provided with facilities for releasing the link 12 if a single impulse first digit is dialed into the connector. The connector 12b also responds to dial impulses (two digits) originating at the calling line with which the link 12 is operatively associated to select the particular pulse time position assigned to the called line. Incident to the selection of this time position, the connector 12b conditions itself to accept signal carrying pulses from the multiplexer 11 which occur in the pulse time position corresponding to the selected called line, to store the intelligence carried by these pulses, and to retransmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12b performs the auxiliary functions of terminating dial tone transmission to the calling substation when the first line selecting impulse is dialed into the connector; feeding busy pulses to the busy conductor 52 in the pulse time position assigned to the called line, thereby to guard the called line against seizure through another link; testing the pulse time position assigned to the called line to determine the idle or busy condition of that line; transmitting busy tone carrying pulses to the distributor 15 in the pulse time position assigned to the calling line in the event the called line tests busy; transmitting a ring start signal by way of the distributor 15 to the line circuit terminating the called line in the event the called line tests idle, concurrently transmitting ring-back tone modulated pulses to the distributor 15 in the pulse time position assigned to the calling line, thereby to signal the calling subscriber that the called substation is being rung; and terminating the ring start signal and concurrently terminating ring-back tone signal transmission to the calling substation in response to answering of the call at the called substation. The connector 12b is also arranged to release in response to the release of a connection involving the link 12 at the calling substation.

To perform the above-mentioned functions, the connector 12b, as diagrammatically illustrated in Fig. 2B, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by the signal bearing pulses transmitted to the connector from the multiplexer 11 in the pulse time position assigned to the calling line. The connector 12b further comprises a called line out gate circuit 224 for gating to the distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate to the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12b additionally comprises a plurality of components for responding to two digits of dial pulses repeated to the connector on multiplexer pulses occurring in the pulse time position assigned to the calling line. In general, the dial pulse responsive equipment of the connector 12b comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with the numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i. e., initiate certain operations at the ends of the first and second digits dialed into the connector.

In accordance with the present invention, the connector 12b is also provided with a digit cancelling circuit 300. This circuit is interconnected with the tens sequence timing circuit 212, the tens digit register 211 and the +B switching circuit 201, and functions to release the link 12 when a first digit, or the equivalent, consisting of a single impulse is transmitted to the connector 12b.

The connector further comprises a connector pulse forming circuit 217 which is controlled in accordance with the settings imparted to the tens and units digit registers 211 and 215 at the end of a dialing operation to produce the connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221 which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors 30a, 30b–30j over which negative units pulses are sequentially transmitted in the order named to the units coincidence tube circuits 204 of the finders 12a, 13a and 14a and the units digits registers 215 of the connectors 12b, 13b, 14b. In time coincidence with the described negative units pulses, the ring circuit 20 produces positive units pulses on the ten units pulse conductors 31a, 31b–31j forming the cable 31, which are transmitted to the units gate circuits of the distributor 15 and also to the pulse gate circuits of a channel pulse commutator 22. The positive units pulses developed upon the two conductors 31a and 31f are also employed to control a bias and ringing carrier supply circuit 26. The positive and negative units pulses are sequentially developed on the units leads 31 and 30, respectively, at a frequency rate of 100 kilocycles and each tenth positive units pulse, i. e., each pulse appearing on the units pulse conductor 31j, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32a, 32b–32j forming the cable 32 are impressed upon the tens pulse gate circuits of the multiplexer 11 and the tens pulse gate circuits of the distributor 15 in the manner more fully explained below. The negative tens pulses as produced by the ring circuit 21 in time coincidence with the positive tens pulses and as sequentially impressed on the tens pulse conductors 33a, 33b–33j forming the cable 33 are impressed on the tens coincidence tube circuits 203 of the finders 12a, 12b and 12c and the tens digit registers 211 embodied in the connectors 12b, 13b and 14b, all in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34a, 34b–34j forming the cable 34, which are fed to the units pulse gate circuits of the multiplexer 11. These channel pulses occur at the same frequency as the units pulses, but are much narrower in width. For example, the channel pulses appearing on the conductor 34a are much narrower than the units pulses appearing on the positive units pulse lead 31a and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12b, 13b and 14b.

The common equipment 17 further comprises a link allotter 24 having the function of developing link allotting pulses of relatively long duration (preferably each pulse persists for at least one millisecond) successively on the link allotting conductors 36a, 36b and 36c. These conductors individually extend to the pulse combining circuits 202 of the finders 12a, 13a and 14a and the pulses impressed thereon perform the function of rendering the respective corresponding links available for use providing the links are not already occupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over common multiple conductors 37 and 38. The common equipment also includes dial tone and busy tone sources which are collectively indicated at 29 in Fig. 4 of the drawings and are respectively connected by way of the multiple conductors 46 and 47 to the supervisory tone gate circuits 225 of each of the connectors 12b, 13b and 14b. The common equipment further comprises a ring-back tone generator 29c, the output signal of which is keyed by the ringing keying circuit 27 and supplied to the supervisory tone gate circuits 225 of each of the connectors 12b, 13b and 14b over a common multiple conductor 48. Finally, the common equipment includes a ringing supply circuit 60 which embodies a 20-cycle ringing current source and which is connected by way of two common multiple conductors 61a and 61b within the cable 61 to each of the line circuits of the system.

In order to render the mode of operation of the system more readily understandable, a pulse chart has been illustrated in Figs. 6 to 9, inclusive, to show the relative widths of the pulses developed by the common equipment components 19, 25, 20, 21 and 22 during two successive pulse frames, as well as the time or phase relationship between the pulses. As there shown, the units pulse ring drive pulses 95a, appearing on the conductor 40 are produced by the phase shifter and pulse former circuit 19 along the zero potential reference line 95 at a frequency rate of one megacycle and are of positive polarity. Similarly, the channel pulse commutator drive pulses 96a appearing on the conductors 41 and 35 are produced by the phase shifter and pulse former network 19 along the zero potential reference line 96 at the same frequency of one megacycle and are of positive polarity. It will be noted that both the units pulse ring drive pulses 95a and the commutator drive pulses 96a are very narrow, i. e., persist for very short time intervals, and that the pulses 96a are so displaced in time relative to the pulses 95a that each commutator drive pulse 96a occurs approximately at the middle of the period separating the preceding and succeeding units pulse ring drive pulses 95a. The positive units pulses appearing respectively on the units pulse conductors 31b, 31c–31j and the negative units pulses coincidentally appearing on the units pulse conductors 31a, 31b–31j are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors a, b–j, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62a, 62b, 62c, etc. along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33a, 33b–33j and the positive tens pulses coincidentally produced on the tens pulse conductors 32a, 32b–32j are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus, the positive and negative tens pulse 72a persists for the duration of the interval in which the ten units pulses 62a–71a are successively produced by the units pulse ring circuit 20. It will also be noted that the starting point of each tens pulse period 72a, 73a, 74a, etc. is exactly coincident with the starting points of the positive and negative units pulses 62a, 62b, 62c, etc. appearing along the zero potential reference line 62 and impressed upon the units pulse conductors 30a and 31a, respectively, by the units pulse ring circuit 20. Further, each tens pulse period terminates at the exact instant of termination of the positive and negative units pulses 71a, 71b, 71c, etc. appearing along the zero potential reference line 72 and produced by the units pulse ring circuit 20 on the conductors 30j and 31j, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31j to step or trigger the tens pulse ring 21 on a periodic basis.

The channel pulses which are successively produced on the ten channel pulse conductors 34a, 34b–34j by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96a appearing along the zero potential reference line 96. Like the positive and negative units pulses, the channel pulses are produced at the fundamental frequency rate of one megacycle, but due to the action of the commutator 22 in diverting these pulses successively to the conductors 34a, 34b–34j recur only on each of these conductors at a rate of one hundred kilocycles. Thus, the channel pulses 82a, 82b, 82c, etc. appearing along the reference line 82 and impressed on the conductor 34a are spaced apart timewise by like intervals each of which exactly equals the sum of ten units pulse time periods. During this spacing interval, nine additional channel pulses are successively produced along the reference lines 83, 82–91 to appear on the conductors 34b, 34c–34j. It will also be noted that the channel pulses are very narrow in width, having a persistence interval of the order of one fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95a, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 6 to 9, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12—10 are defined by the first tens pulse period 72a of the frame within which the ten units pulse periods 62a, 63a, 64a–71a occur. Similarly, the second ten pulse time positions, which are respectively assigned to the lines of the system having the directory number designations 21, 22, 23—20, are defined by the second tens pulse period 73a during which the ten units pulse periods 62b, 63b, 64b–71b occur. Again, the third ten pulse time positions, which are respectively assigned to the lines of the system having the directory number designations 31, 32, 33—30 are marked out by the third tens pulse time period 74a during which the ten units pulse periods 62c, 63c, 64c–71c occur. Thus, it will be understood that the pulse time position of each pulse frame which is assigned to the illustrated line 23 occurs during the second tens pulse interval 73a of each pulse frame and is coincident with the units pulse period 64b of each pulse frame. It will also be apparent that the corresponding signal pulse 84b occurs well within the limits of this pulse time position. Similarly, the pulse time position 32 assigned to the illustrated line 32 occurs during the third tens pulse time interval 74a of each pulse frame is coincident with the second units pulse period 63c of each pulse frame. Here again, each channel pulse 83c corresponding to the line 32 occurs well within the limits of the particular pulse time position assigned to the line 32 in each pulse frame.

Briefly to consider the general mode of operation of the system of Figs. 1 to 4, inclusive, it may be assumed that the substation B is called from the substation A during a period when the finder-connector link 12 is idle and is allotted for use under the control of the link allotter 24. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53 to the units gating circuit of the multiplexer 11 which individually corresponds to the line 23. The multiplexer 11 responds to this change in magnitude of the controlling bias potential supplied thereto from the line circuit 10 by opening the units gate corresponding to the line 23 to permit the ten pulses 84a, 84b, 84c, etc. to pass through this gate. The tens gate circuit controlled by the tens pulse 73a corresponding to the ten line subgroup including the line 23, is, however, only opened in coincidence with the signal pulse 84b during each pulse frame. Accordingly, only the signal pulses 84b occurring during the pulse time positions 64b of successive pulse frames, are permitted to pass over the common conductor 50 to the pulse input circuits 200 of the finders 12a, 13a and 14a and the in gate circuits 207 and 223 of the connectors 12b, 13b, and 14b in parallel. At this point the pulse transmitted from the multiplexer 11 over the common conductor in the pulse time position 64b may be regarded as multiplexer pulses 84b. Since only the link 12 is conditioned by the allotter 24 and the combining circuit 202 of the finder 12a to handle the call, and the connector 12b of this link is as yet inoperative, only the finder 12a initially responds to the multiplexer pulses 84b delivered thereto from the multiplexer 11 over the conductor 50 in the described pulse time position 64b.

In the finder 12a, the multiplexer pulses 84b are repeated by the pulse input circuit 200 to effect substantially immediate operation of the +B switching circuit 201 embodied in this finder, whereby operating anode potentials are delivered to the tubes of the circuits 209, 211, 212, 213, 214, 215, 216, 218, 219, 223, 224 and 225 of the connector 12b over the +B switch conductor 12c, with the result that the connector 12b is conditioned for operation, i. e., conditioned to respond to signal carrying multiplexer pulses delivered thereto from the multiplexer 11 over the conductor 50. Operation of the +B switching circuit in the finder 12a also has the effect of conditioning the tens and units coincidence tube circuits 203 and 204 of this finder for operation under the joint control of the multiplexer pulses 84b repeated by the input circuit 200, the negative tens pulses developed by the tens pulse ring circuit 21 and the negative units pulses developed by the units pulse ring circuit 20. In responding to the tens and units pulses impressed thereon coincidentally with the multiplexer pulses 84b, the tens and units coincidence tube circuits 203 and 204 of the finder 12a cooperate with the finder pulse forming circuit 205 and the combining circuit 202 of this finder to produce finder gating pulses which are transmitted over the conductor 12d to the circuits 207, 208 and 226 of the connector 12b and have the effect of initially limiting the response of the connector only to multiplexer pulses 84b appearing in the pulse time position 64b. The combining circuit 202 of the finder 12a also gates busy pulses in the pulse time position 64b which are fed over the common busy lead 52 to each of the other finders and connectors of the system to prevent these finders from responding to multiplexer pulses occurring in this time position. Thus, the line 23 is guarded against intrusion on an incoming call. In addition, the pulses gated by the circuit 202 to the conductor 12d are impressed upon the pulse input circuit 200, thereby to render the finder 12a responsive only to multiplexer pulses 84b appearing in the pulse time position 64b. Finally, the busy pulses developed in the time position 64b render the finder 12a nonresponsive to link allotter pulses impressed upon the allotter conductor 36a, individual to the link 12, by the allotter 24. After the finder 12a has operated to perform the described functions, continued holding of the finder 12a is dependent upon continued acceptance and transmission of multiplexer pulses 84b by the pulse input circuit 200, which, of course, means that the finder will remain associated with the calling line 23 only so long as a calling condition persists on this line.

As indicated above, when the +B switching circuit 201 of the finder 12a operates to apply operating anode potential to the conductor 12c, the circuits 209, 211, 212, 213, 214, 215, 216, 218, 219, 223, 224 and 225 of the connector 12b are conditioned for operation. Immediately anode potential is applied to the dial tone gating tube of the network 225, this network functions to transmit a dial tone signal, derived from the dial tone generator 29b over the conductor 47, to the calling line out gate circuit 226 over the conductor 244. This circuit in responding to the dial tone signal and also to the finder gate pulses delivered thereto over the conductor 12d and the commutator drive pulses 96a delivered thereto over the conductor 35, functions to repeat over the channel conductor 51 to the distributor 15 connector signal pulses modulated in accordance with the dial tone signal in the pulse time position 64b assigned to the calling line. The distributor 15 responds to the connector signal pulses thus transmitted thereto by repeating the same through the tens and units gate circuits thereof over the conductor 44a to the line circuit 10. In the line circuit 10, the dial tone signal is detected and transmitted over the line 23 to signal the calling subscriber that the dialing operation may be initiated.

Two digits of dial impulses must be dialed into the connector 12b in order to effect selection in the connector of the pulse time position 63c assigned to the called line 32. More specifically, the directory number digits 3 and 2 must be dialed successively into the connector 12b to effect selection of the pulse time position 63c. During the open circuit period of each dial impulse, the control bias supplied by the line circuit 10 to that units gate circuit of the multiplexer 11 which corresponds to the calling line 23 is returned to its on hook value to interrupt the transmission of multiplexer pulses 84b over the conductor 50 to the pulse input circuit 200 of the finder 12a and to the in gate circuits 223 and 207 of the connector 12b. At this point, it is noted that the +B switching circuit has a fundamentally new time delay feature incorporated therein which prevents this circuit from removing operating anode potential from the conductor 12c during the open circuit periods of dial impulses, hook switch flashing and the like. Thus, premature release of the link 12 during dialing is positively prevented through the action of the +B switching circuit 201 to maintain operating anode potential upon the conductor 12c during the open circuit period of each dial impulse. With the +B switching circuit 201 operating to supply anode potentials to the tubes of the coincidence tube circuits 203 and 204 of the finder 12a, finder gating pulses continue to be transmitted over the conductor 12d to the circuits 207, 208 and 226 of the connector 12b. Thus, these circuits are held in condition to respond to intelligence and control signals delivered thereto from the multiplexer 11 on multiplexer pulses 84b impressed upon the conductor 50 in the pulse time position 64b.

During the make period of each impulse dialed at the calling substation multiplexer signal pulse transmission from the multiplexer 11 to the finder 12a and the connector 12b in the pulse time position 64b is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens changeover gate circuit 210 and the units start gate circuit 213 over the conductors 227 and 228, respectively. Pending operation of the tens sequence timing circuit 212, the units start gate circuit 213 is held non-responsive to the three impulses transmitted thereto by the dial impulse integrator circuit 209 during dialing of the first digit 3 at the calling substation. However, the tens changeover gate circuit functions to repeat the three impulses over the conductors 230 and 231 respectively to the tens digit register circuit 211 and the tens sequence timing circuit 212. In responding to the three impulses thus transmitted thereto, the tens digit register 211 is driven to a setting wherein tens pulses appearing on the negative tens pulse conductor 33c in the third tens pulse time position 74a of each pulse frame may be transmitted through the third tens gate of this register and over conductor 232, to the connector pulse forming circuit 217. Transmission of the three impulses individually corresponding to the three break periods of the first digit dialed at the calling substation over the conductor 231 to the tens sequence timing circuit 212 has the effect of conditioning this circuit to block the tens changeover gate circuit from repeating impulses to the tens digit register 211 during dialing of the second digit and to render the units start gate circuit 213 operative to repeat the pulses delivered thereto by the dial impulse integrator circuit 209 during dialing of the second digit at the calling substation. Immediately the first dial impulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens changeover gate circuit 210 against repeating further impulses transmitted thereto from the dial impulse integrator circuit 209. In assuming this condition, the tens sequence timing circuit 212 also changes the potential level on the conductor 235 to render the units start gate circuit operative to repeat impulses delivered thereto from the dial impulse integrator circuit 209 to the units changeover gate circuit 214 over the conductor 238.

During dialing of the second digit 2 at the calling substation A, the dial impulse integrator circuit 209 responds by transmitting two impulses to each of the gate circuits 210 and 213. As noted above, however, the changeover gate circuit 210 is now blocked against repeating these impulses. The units start gate circuit 213 repeats the two impulses to the units changeover gate circuit 214 over the conductor 238 and the latter circuit repeats the impulses over the conductors 236 and 237, respectively, to the units digit register 215 and the units sequence timing circuit 216. As a consequence, the units digit register is operated or driven to open the second units gate circuit therein, thereby to establish a path for the transmission of units pulses appearing in the time positions $63a$, $63b$, $63c$, etc., to the connector pulse former circuit 217. The two pulses repeated to the units sequence timing circuit 216 over the conductor 237 serve to condition this circuit for operation at the end of the second digit.

At the end of the second digit dialed into the connector $12b$, the units sequence timing circuit 216 operates to change the potential level on the conductor 241 to a value such that the units changeover gate circuit 214 is blocked against further pulse transmission therethrough. Concurrently, a potential is applied to the conductor 242 in the units sequence timing circuit 216 which has the effect of rendering the busy test circuit 218 operative to determine the idle or busy condition of the called line by testing the pulse time position $63c$ assigned to this line.

The potential applied to the conductor 242 also has the effect of rendering the connector pulse forming circuit 217 operative to mix the tens and units pulses respectively transmitted thereto from the registers 211 and 215 over the conductors 232 and 245 to produce a resultant connector pulse which appears on the conductor 239. More specifically, the tens pulses $74a$ appearing on the negative tens pulse conductor $33c$ and gated by the tens digit register 211 are transmitted to the connector pulse former circuit 217 over the conductor 232 where they are mixed with the negative units pulses appearing in the time position $63c$ which are gated by the units register 215 and transmitted to the circuit 217 over the conductor 245. Mixing of these pulses in the circuit 217 results in the production of a resultant connector pulse which occurs during each pulse frame in the pulse time position $63c$ assigned to the called line. These pulses are transmitted over the conductor 239 to the connector components 218, 220, 222, 223 and 224.

Effectively, the busy test circuit 218 and the busy lock circuit 219 cooperate to perform the busy test operation in the connector $12b$. More specifically, if the called line 32 is busy, i. e., occupied with a call, busy pulses are present on the common busy conductor 52 in the pulse time position $63c$ assigned to the called line. The manner in which such busy pulses are applied to the conductor 52 in another link occupied with the call involving the line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239. Coincidence between the connector pulses and the busy pulses has the effect of preventing the busy test circuit from operating. Thus, the busy condition of the called line is indicated.

In the event the called line is busy, the busy lock circuit 219 as controlled over the conductors 242 and 246 and through the resistor 247 from the units sequence timing circuit 216 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone source by way of the conductor 46, the busy gate circuit in the network 225, the calling line out gate circuit 226, the channel conductor 51, the distributor 15 and the line circuit 10 to the calling line. Thus, the calling subscriber is advised of the busy condition of the called line.

Assuming that the called line 32 is idle at the time the pulse time position $63c$ assigned thereto is selected in the connector in the manner explained above, such busy pulses as may be present on the common busy lead 52 do not occur coincidentally with the connector pulses generated by the connector pulse forming circuit 217 in the pulse time position $63c$ assigned to the called line. When coincidence between the connector pulses and the busy pulses is lacking, the busy test circuit operates immediately the first connector pulse is impressed thereon from the connector pulse forming circuit 217 over the conductor 239. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position $63c$ to the distributor 15, and is applied to the busy gate circuit 220 so that connector pulses are released to the busy conductor 52 and is also applied to the network 225 to act as an operating anode potential for the ring back tone gate tube of this network. The positive potential developed on the cut-through conductor 251 is also applied to the called line in-gate circuit 223 and the called line reconstructor circuit 222, thereby to condition these circuits to accept signals derived from the called line. This feature of making operation of the circuits 223 and 222 dependent upon operation of the busy test circuit to indicate that the called line is idle, is necessary in order to prevent the calling subscriber from listening in on a conversation being held over the called line when the called line is busy.

The positive potential applied to the cut-through conductor 251 is also impressed upon the ring trip circuit 221 and is applied through certain components of this circuit to the ring trip conductor 253 which extends to both the called line out gate circuit 224 and to the ring back tone gate circuit of the network 225. When this occurs, the ring back tone gate circuit of the network 225 is rendered operative to transmit the intermittent ring back tone signal derived from the keying circuit 27 over the conductor 48 to the calling line out gate circuit 226 over the conductor 244. The ring back tone signal is modulated on the signal pulses developed by the out gate circuit 226 and thus transmitted by way of the conductor 51 and the distributor 15 to the line circuit 10. In the line circuit 10, the ring back tone signal is detected and transmitted over the calling line 23 to the calling substation. Thus, the calling subscriber is signaled that the called substation is being rung.

When the called line out gate circuit 224 is conditioned for operation through application of the described positive potential to the cut-through conductor 251, it responds to the connector pulses impressed upon the connector pulse conductor 239 by connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position $63c$ assigned to the called line, whereby very narrow connector signal pulses are released over the conductor 51 to the distributor 15 which are well within the limits of the pulse time position $63c$ assigned to the called line. So long as the positive potential applied to the cut-through conductor 251 in the busy test circuit 218 is fed through the ring trip circuit 221 to the ring trip conductor 253, the called line out gate circuit 224 is controlled to release connector signal pulses to the distributor 15 in the pulse time position $63c$ which are approximately fifty per cent larger in amplitude than those used to convey intelligence signals to the distributor 15 after the call is answered at the called substation B. These large amplitude signal pulses are diverted by the distributor 15 to the line circuit 16 and serve to signal this line circuit that the ringing operation should start. More specifically, the large amplitude connector signal pulses are released by the distributor 15 to the line circuit 16 over the conductor $54a$. In this line circuit, these pulses have the effect of activating the ringing control facilities of the line circuit 16 with the result that ringing current keyed at a slow rate of approximately one second on and four seconds off is transmitted over the line 32 to energize the ringer provided at the called substation B. Ringing of the called substation persists until the call is answered or until the call is abandoned at the calling substation A. Assuming that the call is answered, the line circuit 16 functions to change the magnitude of the control potential supplied over the conductor 45 to the multiplexer 11 with the result that the gate assigned to the called line 32 in the multiplexer 11 is opened to permit multiplexer pulses 83c occurring in the pulse time position 63c of each pulse frame to be transmitted through the corresponding tens and units gate circuits of the multiplexer 11 and over the conductor 50 to the multiplexer input terminals of each of the finders and connectors of the system.

The multiplexer pulses 83c are impressed upon the calling and called line in gate circuits 207 and 223 in the connector 12b. In the calling line in gate circuit 207, the repeated multiplexer pulses 83c are not in coincidence with the finder gate pulses impressed upon the circuit 207 over the conductor 12d and hence are not repeated to the reconstructor circuit 208. However, in the called line in gate circuit 223 the multiplexer pulses 83c occur in time coincidence with the connector pulses impressed upon the circuit 223 over the connector pulse conductor 239 from the connector pulse former circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the positive potential on the ring trip conductor 253. The called line out gate circuit 224 responds to this reduction in potential on the conductor 253 by decreasing by approximately fifty per cent the amplitude of the connector signal pulses transmitted over the conductor 51 and through the distributor 15 to the line circuit 16. The ringing control facilities of the line circuit 16 respond to this decrease in the amplitude of the connector signal pulses delivered thereto by terminating the transmission of ringing current to the called substation. Thus, the ringing operation is arrested. The decrease in the positive potential present on the ring trip conductor 253 which occurs when the ring trip circuit 221 operates also has the effect of closing the ring back time signal transmission gate of the network 225, with the result that transmission of the ring back tone signal to the calling substation is arrested.

Following the described operations in the connector 12b, a two-way talking or communication circuit is fully established between the calling substation A and the called substation B. Thus, voice or other signals developed at the substation A and transmitted over the line 23 to the line circuit 10 serve to vary the bias voltage impressed upon the gate circuit of the multiplexer 11 over the conductor 53 directly in accordance with the instantaneous amplitude of such signals. As a consequence, the multiplexer pulses 84b released by the multiplexer 11 over the conductor 50 to the finders and connectors of the system in the pulse time position 64b are modulated in accordance with the voice or other signals developed at the calling substation A. These signal modulated multiplexer pulses cannot be accepted by any finder of the system other than the finder 12a or any connector of the system other than the connector 12b because of the busy pulses fed to the busy conductor 52 from the circuit 205. In the finder 12a, the multiplexer pulses 84b maintain the +B switching circuit 201 operated to hold the link 12 associated with the line 23. The signal modulated multiplexer pulses 84b are also transmitted through the calling line in gate circuit 207 and over the conductor 255 to the calling line reconstructor circuit 208 where they occur in time coincidence with the finder gating pulses impressed upon the reconstructor circuit over the conductor 12d in pulse time position 64b. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63c assigned to the called line. These modulated signal pulses are transmitted to the distributor 15 over the conductor 51 and released by the distributor 15 to the line circuit 16. In the line circuit 16, the signal components of the connector signal pulses are detected and transmitted over the line 32 to the called substation B where they are audibly reproduced by the receiver of the telephone instrument provided at the called substation.

Voice signals developed at the called substation B and transmitted over the line 32 to the line circuit 16 cause the bias potential delivered over the conductor 45 to the gate circuit of the multiplexer 11 which corresponds to the called line 32 to vary in exact accordance therewith. As a consequence, the voice signals are modulated upon the multiplexer pulses 83c occuring within the pulse time position 63c and released through the units and tens gates of the multiplexer and over the conductor 50 to the finders and connectors of the system. These signal modulated multiplexer pulses cannot be accepted by any finder of the system for the reason that the finder 12a is synchronized to accept only multiplexer pulses 84b occurring in the time position 64b and the busy pulses fed to the busy conductor 52 in this time position 64b assigned to the called line by the busy gate circuit 220 of the connector 12b prevent the other finders from accepting or responding to the described signal modulated multiplexer pulses 83c. In the connector 12b, the signal modulated multiplexer pulses 83c are impressed upon the calling and called line in gate circuits 207 and 223 and are repeated by the circuits 223 over the conductor 254 to the called line reconstructor circuit 222. Due to lack of coincidence between the signal bearing multiplexer pulses 83c and the finder gating pulses impressed upon the calling line in gate circuit 207 over the conductor 12d, the circuit 207 does not gate these pulses to the reconstructor circuit 208. By virtue of the coincidence between the signal bearing multiplexer pulses 83c and the connector pulses appearing coincidentally on the conductor 239, both of which are impressed upon the called line reconstructor circuit 222, this circuit detects or reconstructs and stores the voice signal components carried by the multiplexer pulses 83c. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12d. The voice signal modulated pulses developed in the calling line out gate circuit 226 are released by the distributor 15 in the pulse time position 64b and are diverted to the line circuit 10 through the gating circuit of the distributor which corresponds to the calling line. In the line circuit 10, the signal components of the pulses released by the calling line out gate circuit 226 are detected and transmitted over the line 23 to the calling substation A, where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. This non-interfering feature of the system primarily results from the assignment of two discreet and non-interfering pulse time positions in each pulse frame for the transmission of voice or intelligence modulated signals simultaneously through the switching equipment of the system in both directions. Secondarily, it results from physical separation of the intelligence gating circuits in the connector 12b into six discreet components. Thus, the calling line in gate circuit 207, the calling line reconstructor circuit 208 and the called line out gate circuit 224 are used only to repeat intelligence or voice signals from the calling line to the called line, whereas the called line in gate circuit 223, the called line reconstructor circuit 222 and the calling line out gate circuit 226 are used only to repeat intelligence or voice signals from the called line to the calling line.

In describing the manner in which the system components 10, 11, 12a, 12b, 15 and 16 are partially or wholly released upon termination of the call, it may be assumed first that the called party at the substation B is the first to hang up. In such a case, the bias potential delivered from the line circuit 16 over the conductor 45 to the gating circuit of the multiplexer 11 individually assigned to the called line 32 is restored to its normal value when the called line loop circuit is opened, with the result that multiplexer pulses 83c appearing in the pulse time position 63c are no longer transmitted over the conductor 50 to the finders and connectors of the system. Such termination of multiplexer pulse transmission in the time position 63c to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63c assigned to the called line continue to be fed to the busy conductor 52 from the busy gate circuit 220 of the connector 12b, thereby to prevent the called line 32 from originating a call or accepting an incoming call. This, of course, means that if the called subscriber picks up his receiver or hand set before the connection is released at the calling substation A, conversation may be resumed between the calling and called subscribers.

When the calling subscriber disconnects by replacing the receiver or hand set at the substation A on its supporting hook or cradle, the loop circuit extending by way of the line 23 to the line circuit 10 is opened, with the result that the bias potential applied over the conductor 53 to that gate circuit of the multiplexer 11 which individually corresponds to the calling line 23 is restored to its normal value. As a consequence, this gate circuit is biased to terminate the transmission of multiplexer pulses 84b occurring in the pulse time position 64b over the conductor 50 to the various finders and connectors of the system. When the transmission of multiplexer pulses 84b to the pulse input circuit 200 of the finder 12a is thus terminated, this circuit is rendered inactive to repeat pulses to the finder circuits 201, 203 and 204. After a predetermined time interval, measured by the overall time constant of the +B switching circuit 201, this circuit responds to cessation of multiplexer pulse transmission thereto by removing the operating anode potential from the conductor 12c. As a consequence, the tens and units coincidence tube circuits 203 and 204 of the finder 12a are restored to normal to interrupt the production of finder gate and busy pulses in the pulse time position 64b by the finder pulse forming circuit 205. Thus, the application of pulses to the combining circuit 202 and hence to the busy conductor 52 in the pulse time position 64b assigned to the calling line 23 is arrested. Termination of pulse transmission to the combining circuit 202 in the time position 64b has the effect of rendering this circuit operative under the control of the link allotter 24 to reassociate the link 12 with another calling line to handle another call. Cessation of busy pulse transmission to the conductor 52 in the pulse time position 64b has the effect of marking the calling line 23 as idle to permit initiation of a second call on this line or seizure of the line on a call incoming thereto.

Removal of operating anode potential from the conductor 12c also has the effect of restoring the component circuits 209, 211, 212, 213, 214, 215, 216, 218, 219, 223, 224 and 225 of the connector 12b to normal, thereby to condition the connector 12b to handle another call. Incident to normalizing of the connector pulse forming circuit 217, connector pulse production on the conductor 239 in the pulse time position 63c assigned to the called line 32 is terminated to arrest the application of busy pulses to the common busy conductor 52 by the busy gate circuit 220 in this pulse time position. Thus, the called line is unguarded to free the same for use in initiating another call or accepting a call incoming thereto. It will be noted that normalizing of the identified circuits of the connector 12b has the effect of restoring all components of this connector to the condition which prevailed at the time the link 12 was taken into use to handle the call just described.

As will be evident from the immediately preceding explanation, the key component involved in effecting release of the link 12 is the +B switching circuit 201 embodied in the finder 12a. So long as multiplexer pulses are repeated to this circuit by the pulse input circuit 200 in the time position assigned to the calling line, the circuit positively prevents release of the link 12 and holds both the calling and called lines out of service, i. e., prevents use of the same in initiating outgoing calls or accepting incoming calls. However, when multiplexer pulse transmission by way of the pulse input circuit 200 to the +B switching circuit 201 is arrested for a period of time greater than approximately one-fourth of a second, this switching circuit immediately effects release of the link regardless of the extent of progress of the call and regardless of whether or not the connection has been released at the called substation. Thus, normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i. e., hang up, the link 12 is immediately released under the control of the +B switching circuit 201 embodied in the finder 12a. In such case, the line circuit 16 associated with the called line 32 immediately assumes a setting indicating that the line 32 is calling, with the result that a link is assigned to the called line under the control of the allotter 24 and the usual dial tone signal is returned to the called subscriber. This signal has the effect of indicating to the called subscriber that the connection has been released at the calling substation and that he should hang up.

In order to prevent electrical impulses which result from momentary depressions of the receiver hook and are commonly called switchhook "flubs," from being interpreted by the equipment as dialing impulses and hence causing a bad call, there is provided, in accordance with the present invention, a digit cancelling system wherein the seized finder-connector link is automatically released when a first digit comprising a single impulse is dialed or otherwise transmitted to the connector 12b. With this arrangement either the dialing of a first digit of "1," or the occurrence of a single switchhook "flub" impulse will cause the link to be released.

To accomplish the above-described digit cancelling action, there is provided in accordance with the present invention a digit cancelling circuit 300 (Fig. 2B). Control pulses, which are indicative of the dialing of a tens digit of a predetermined designation, are supplied from the tens digit register 211 over the conductor 301 to the digit cancelling circuit 300. In this connection it will be understood that the electronic telephone system herein described is predicated on the basis of one hundred lines so that the tens digit will be the first digit dialed; hence, the tens digit register may be utilized as a source of control pulses which are indicative of the numerical value of the particular tens digit which has been dialed and correspondingly when a switchhook "flub" occurs which might be interpreted as a particular tens digit. When the selected tens digit is dialed and control pulses are supplied over the conductor 301 to the circuit 300, this circuit operates to supply a positive pulse to the B+ switching circuit 201 over the conductor 12e which has the effect of extinguishing the +B switching tube of the circuit 201. When this occurs, this +B switching circuit 201 removes operating anode potential from the conductor 12c thereby to release the link 12 and condition the link to handle another call. In order to prevent the digit canceling circuit from releasing the link in response to the first impulse of a plural impulse tens digit, the digit canceling circuit 300 is normally blocked and an enabling control potential is supplied from the tens sequence timing circuit 212 over the conductor 302 which is indicative of the completion of the first digit. With this arrangement, the first dial impulse of a plural impulse tens digit, such as the digit "5," cannot cause the digit canceling circuit to be activated.

When the finder-connector link 12 is disabled by the above-described action of the canceling circuit 300, the calling line will be refound by an idle finder of one of the remaining finder-connector links of the system. Due to the fact that the entire switching action described above takes place very rapidly, the first finder connector link 12 is disabled upon the dialing of the tens digit "1," or the occurrence of a switchhook "flub" corresponding thereto and another finder-connector link is seized before further dialing commences.

Considering now in detail the digit cancelling system described generally above, reference may be had to Fig. 10 wherein the circuit details of the digit cancelling facilities are shown. From the above description of the connector 12b, it will be seen that the tens digit register 211 thereof functions to register the numerical value of any tens digit dialed at a calling substation. Specifically, certain of the tubes of the tens digit register 211 are connected to operate as a pulse counting chain wherein the cathodes of all of the tubes are connected to a common cathode conductor to which dialing impulses are applied so as to fire the tubes in sequence in accordance with the number of electrical impulses of the particular tens digit which is dialed. Thus, if the tens digit "3" is dialed, three pulses will be supplied to the pulse counting chain of the tens digit register 211 and the third counting tube will be ionized in response to the third impulse of the digit and will remain conductive for the duration of the call. The tens digits register 211 operates to gate to the connector pulse forming circuit 217 only those tens pulses which occur in the tens time pulse position assigned to a particular called line. Thus, the output of each counting stage of the tens digit register may be utilized as a source of negative control pulses which are indicative of the numerical value of the particular tens digit which has been dialed.

Inasmuch as the electronic telephone system shown in Figs. 1 through 4 is predicted on a system comprising one hundred lines, the tens digit will be the first digit dialed and also the first counter tube of the tens digit register will correspond to a first dialed digit of "1." Accordingly, the first counter stage of the tens digit register 211 is utilized, in accordance with the present invention, to provide a source of pulses which are present only when a tens digit "1" is dialed and, correspondingly, when a switchhook "flub" gives rise to a pulse which may be interpreted as the dial impulse "1." The details of the first counter stage of the tens digit register 211 are shown in Fig. 10 wherein a cold cathode triode 310 acts as a switching device to permit connection of negative tens pulses from the tens pulse ring circuit 21 (Fig. 4) to the connector pulse forming circuit 217. More specifically, negative tens pulses occurring in the time position 72a (Fig. 6) are supplied from the tens pulse ring circuit 21 over the conductor 33a to one side of the coupling capacitor 311. The other side of the capacitor 311 is connected to the cathode of a crystal gating rectifier 312, the anode of which is connected through the common pulse output conductor 232 to the connector pulse forming circuit 217. The anode of the device 310 is connected through a resistor 313 to the +B switching conductor 12c. The anode of the device 310 is further connected through a resistor 314 to the cathode of the device 312. The pulse output conductor 232 is further connected through a resistor 317 to the +B switching conductor.

With the device 310 non-conductive, the above-described negative gating pulses occurring in the time position 72a are not passed by the gating rectifier 312. This is readily apparent when it is realized that both the anode and cathode of the gating device 312 are connected to the +B switch conductor 12c through the resistors 313 and 314, and the resistor 317, respectively. However, upon the occurrence of the first dialing impulse, or a switchhook "flub" which may be interpreted as the first dialing impulse, the control electrode 315 of the device 310 is driven sufficiently positive with respect to the cathode 316 by a primer tube which precedes the first counted tube 310, so as to cause the device 310 to fire. If a second dial impulse occurs, the device 310 is rendered non-conductive by the application of a large positive pulse to the common cathode conductor 320 and the next tube in the counting chain is fired. However, if a tens digit having a designation of "1" is dialed, the device 310 will remain conductive for the duration of the call. When the device 310 is ionized in the manner described above, the anode potential of this tube is decreased to a value lower than the positive potential on the +B switching conductor 12c. The resulting polarity reversal of the potentials on the anode and cathode terminals of the gating rectifier 312 biases this rectifier conductive to cause current flow therethrough. Thus, the rectifier 312 is biased to permit tens pulse transmission from the conductor 33a through the coupling capacitor 311 to the common pulse output conductor 232.

To provide a digit cancelling system which will disable the finder-connector link when the tens digit "1" or the equivalent is dialed into the connector 12, the first counter stage of the tens digit register 211 is utilized to control the application of the negative tens pulses appearing on the conductor 33a to the digit cancelling circuit 300 of the present invention. Thus, the cathode of the gating rectifier 312 is connected by way of the conductor 301 to the cathode of a crystal gating rectifier 325 of the digit cancelling circuit 300. The anode of the rectifier 325 is connected through a resistor 326 to ground and through a resistor 327 to the +B switch conductor 12c. The anode of the device 325 is also coupled to the control electrode of a gas filled thyratron 329 through a capacitor 328. The cathode of the thyratron tube 329 is connected through a resistor 330 to ground and the anode of the tube 329 is connected through the parallel combination of a resistor 331 and a capacitor 332 to the +B switch conductor 12c. The control electrode of the tube 329 is connected to the cathode terminal of a crystal rectifier 335, the anode of which is connected through the resistor 339 and a potentiometer 340 to −100 v. bias, and is further connected through a capacitor 338 to ground. The tube 329 is of the conventional negative grid control type.

When the first dial impulse arrives and the tube 310 is ionized, as described above, the gating rectifier 325 of the digit cancelling circuit 300 is rendered conductive in a manner similar to that discussed in connection with the gating rectifier 312, so as to supply the negative tens pulses appearing on the conductor 33a through the capacitors 311 and 328 to the control electrode of the tube 329. In this connection it will be understood that the voltage divider network including the resistors 326 and 327 provides a potential for the anode of the rectifier 325 which is sufficiently positive to cause the rectifier 325 to conduct when the cathode thereof is driven negative upon conduction of the device 310. When the negative tens pulses are passed by the gating rectifier 325, these pulses are supplied through the capacitor 328 to the control electrode of the tube 329. Due to the fact that the polarity of the pulses is negative, the control electrode is not driven sufficiently positive to cause the cancelling thyratron 329 to fire. However, if a positive unblocking control potential is supplied from the tens sequence timing circuit 212 in a manner to be described in more detail hereinafter, the rectifier 335 is rendered conductive so that the capacitor 328 is charged in the polarity shown and the tube 329 fires. When the tube 329 fires, a large positive pulse appears across the cathode resistor 330 thereof which pulse is supplied through the capacitor 337 and the conductor 12e to the +B switching tube of the +B switching circuit 201. More specifically, the large positive pulse produced across the cathode resistor 330 when the tube 329 fires is supplied to the cathode resistor 342 of the +B switching tube 341. The anode of the +B switching tube is connected to a continuously energized source of unidirectional potential indicated by the reference B+, and the +B switching tube 341 is rendered conductive by the application of positive pulses from the pulse input circuit 200 of the finder 12a (Fig. 2A), as described generally above. Accordingly, when the finder-connector link 12a is first seized and multiplexer pulses supplied thereto from the conductor 50, the +B switching circuit is energized so as to provide a voltage drop across the cathode resistor 342 which may be used as a source of anode voltage for certain of the component circuits of the connector 12b. However, when the cancelling thyratron 329 is fired, the large positive pulse appearing across the resistor 330 thereof is added to the positive voltage normally appearing across the cathode resistor 342 of the +B switching tube so as to cause the cathode of this tube to be driven positive with respect to the anode thereof. The tube 341 is thus extinguished, and the anode voltage supplied over the +B switching conductor 12c falls to zero thus effectively releasing the finder-connector link 12.

In the preceding discussion of the firing of the first counter tube 310 of the tens digit register 211, it has been assumed that the device 310 conducts only when a single dialing impulse occurs. However, the dialing of a tens digit having a designation greater than "1" will cause the device 310 to be ionized momentarily as the counter tubes are keyed sequentially by successive dialing pulses. Thus, if a tens digit having the designation of "5" is dialed, the first five counter tubes will be ionized sequentially in response to the five dial impulses corresponding to the particular named tens digit. The above-described momentary ionization of the tube 310 would permit the cancelling thyratron 329 of the digit cancelling circuit 300 to fire thus causing the circuit to be disabled as described above. Since the link is to be made unresponsive only to the tens digit "1," which corresponds to a switchhook "flub" impulse, it is necessary to provide an unblocking circuit which will allow the cancelling thyratron 329 to fire only when the tube 310 is continuously energized corresponding to the tens digit "1."

In accordance with the present invention, the tens sequence timing circuit 212 is utilized to provide a suitable unblocking control potential so as to permit the cancelling thyratron 329 to fire only when the correct tens digit is dialed. In this connection it will be recalled that the tens sequence timing circuit controls the tens changeover gate circuit 210 and the units starting gate circuit 213 in such a manner that the pulses developed during dialing of the first digit are directed to the tens digits register 211 in the manner described above, the tens digits register 211 is rendered inactive at the end of the first digit, and the impulses developed during dialing of the second digit are registered in the units digit register 215.

Reference may be had to be above-referred to copending application, Serial No. 134,974, for a complete description of the tens sequence timing circuit 212. However, for the purposes of the present invention, it may be stated that the tens sequence timing circuit comprises a starting thyratron tube 350, a discharging tube 351 and a timing thyratron tube 352. The starting tube 350 is rendered conductive by the application of a large positive pulse to the control electrode thereof during the first impulse of the first digit dialed at the calling substation. With the tube 350 ionized, the voltage thereacross drops to a very low value so that substantially the full voltage of the +B switching conductor 12c appears across the cathode resistor 353 of this tube. This voltage is utilized as a voltage source to charge a storage capacitor 354 through the resistor 355. However, the discharging tube 351, which is connected across the capacitor 354, is supplied with dialing impulses from the calling line reconstructor circuit 208 so as to discharge the capacitor 354 during the dial pulse break periods. As a result, the voltage across the capacitor 354 never exceeds a predetermined value during dialing of the first digit. However, during the interdigit pause between the first and second digits, the discharge tube 351 is non-conductive and hence the voltage across the capacitor rises to a large enough value to fire the timing tube 352. In this connection it will be understood that the interdigit pause between the first and second digits is of substantially greater duration than the closed circuit period of each dial impulse and hence the timing tube 352 is responsive only to the interdigit pause which follows dialing of the first digit.

During periods when the device 352 is non-conductive, there is no current flow through the cathode resistor 356 and hence the cathode of the device 352 is at ground potential. However, when the device 352 fires, the resulting current flow through the resistor 356 has the effect of increasing the positive potential level of the cathode of the device 352. The cathode potential of the device 352 is then utilized, in accordance with the present invention, as an unblocking control potential for the cancelling thyratron 329 so as to permit this thyratron to be fired only after the first digit has been completed. When the first digit is completed and the tube 352 fires, the positive potential appearing across the cathode resistor 346 is applied over the conductor 302 to the input terminal 336 of the digit cancelling circuit 300 and through the resistor 357 to the anode of the gating rectifier 335.

Considering now the manner in which the tens sequence timing tube 352 provides the necessary unblocking control potential to permit firing of the cancelling thyratron 329 after dialing of the first digit, it will be seen that during the dialing of the first digit the device 352 is non-conductive and the potential of the cathode thereof is zero. During these periods, the negative tens pulses gated by the crystal rectifier 325 appear across the resistor 326.

Capacitor 328 serves to couple the negative pulses to the grid of thyratron 329 and the cathode terminal of crystal rectifier 335. Rectifier 335 serves to clamp the negative excursion of the pulses to the potential existing at the anode of the rectifier 335, the magnitude and polarity of which is determined by the potential existing across resistor 356, and the magnitudes of the resistors 357, 339, and 340.

By thus clamping the pulses in the manner just described, they in effect appear as long pulses of positive polarity separated by short spaces of one-tenth the duration of the period of the pulses, and thus tend to decrease the negative bias on the grid of tube 329.

The negative bias for the tube 329 is normally of such large magnitude that the presence of the positive long pulses (negatively clamped negative pulses) is insufficient to permit ionization thereof. However, if the tens sequence timing tube 352 fires, the potential across resistor 356 becomes highly positive, this increase being effective to decrease the negative potential existing at the anode of the crystal rectifier 335 to a point (adjustable under control of the potentiometer 340) where the presence of tens pulses across the rectifier 335 will be sufficient to overcome the remaining negative bias and fire the thyratron 329. When the cancelling thyratron is fired, after the first digit is completed and the tens sequence timing tube 352 fires, the +B switching tube 341 is de-ionized and the finder-connector link is released. In this connection it will be understood that if the first digit dialed into the connector 12 comprises two or more impulses, the counter tube 310 of the tens register 211 will be extinguished during the digit to cut off the flow of tens pulses through the rectifier 325. Thus, firing of the tube 352 at the end of the digit cannot result in firing of the disabling tube 329 and the call is allowed to proceed in the normal manner.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In an automatic telephone system, a plurality of lines, means including a plurality of impulse responsive links for setting up connections between said lines, each of said links consisting exclusively of electron valves and static circuit components, and digit responsive link releasing means controlled by certain valves of said links for rendering said links ineffective to set up connections between said lines in response to the transmission of a certain impulse digit thereto.

2. In an automatic telephone system, a plurality of lines, means including a plurality of impulse responsive links for setting up connections between said lines, each of said links comprising at least one string of impulse counting valves, and digit responsive link releasing means controlled by one of the valves of said string upon the completion of a digit for rendering said link ineffective to set up connections between said lines in response to the transmission of a certain impulse digit thereto.

3. In an automatic telephone system, a plurality of lines, means including a plurality of impulse responsive links for setting up connections between said lines, each of said links including at least one string of impulse counting tubes, a digit responsive circuit for developing a control signal upon the completion of a digit, and digit cancelling means included in each link and jointly controlled by one of the counting tubes of said link and the control signal developed by said digit responsive circuit of said link for rendering the link ineffective to set up connections between said lines in response to the transmission of a certain impulse digit thereto.

4. In an automatic telephone system, a plurality of lines, means including an impulse responsive link for routing a call from a calling one of said lines to a called one of said lines, said link consisting exclusively of vacuum tubes and static circuit components, and digit responsive link releasing means including a periodic signal responsive control device controlled by certain tubes of said link for rendering said link ineffective to complete the call in progress in response to the transmission of a certain impulse digit thereto.

5. In an automatic telephone system, a plurality of lines, means including an impulse responsive link for routing a call from a calling one of said lines to a called one of said lines, said link comprising at least one string of impulse counting tubes, and periodic signal responsive control means controlled by one of the tubes of said string upon the completion of a digit for rendering said link ineffective to complete the call in progress in response to the transmission of a predetermined digit to said link.

6. In an automatic telephone system, a plurality of lines, means including an impulse responsive link for routing a call from a calling one of said lines to a called one of said lines, said link including at least one string of impulse counting tubes, a digit responsive circuit for developing a control potential at the end of a digit, and means jointly controlled by one of the tubes of said string and the control potential developed by said digit responsive circuit for rendering said link ineffective to complete the call in progress in response to the transmission of a predetermined digit to said link.

7. In an automatic telephone system, a plurality of lines, means including an impulse responsive link for routing a call from a calling one of said lines to a called one of said lines, said link comprising at least one string of impulse counting tubes, means responsive to excitation of a predetermined one of said tubes for releasing said link, and a digit responsive circuit for preventing said last-named means from operating until a full digit of impulses is transmitted to said link, whereby said last-named means is rendered ineffective to release said link if said predetermined tube is no longer excited at the end of the digit.

8. In an electronic telephone system, the combination of, a directively controllable link, means for developing a continuous control pulse wavetrain in response to the transmission of a predetermined number of call directing impulses to said link, and means operative upon the completion of a digit and responsive to said control pulse wavetrain for rendering said link ineffective for further use in completing the call in progress.

9. In an automatic telephone system, a plurality of lines, means for setting up a connection between a calling one of said lines and a called one of said lines, means including impulse counting means for developing a periodic control signal in response to the transmission of a predetermined number of call directing impulses over a calling one of said lines, and means responsive to said control signal for preventing a connection from being set up between said calling line and a called one of said lines.

10. In an automatic telephone system, a plurality of lines, means including an impulse responsive link for routing a call from a calling one of said lines to a called one of said lines, said link comprising at least one string of impulse counting tubes, means for deriving from one of said tubes a periodic control signal indicative of the dialing of a digit of predetermined designation, a digit responsive circuit, and means including a control tube jointly controlled by said control signal and said digit responsive circuit for rendering said link ineffective to route the call to said called line in response to the transmission of a predetermined digit to said link.

11. In an automatic telephone system, a plurality of lines, means including an impulse responsive link for routing a call from a calling one of said lines to a called one of said lines, means for deriving from said link control pulses indicative of the dialing of a digit of predetermined designation, means for deriving from said link a control potential indicative of the termination of the first digit dialed, a control tube, means controlled by said control potential for unblocking said control tube to permit firing thereof in accordance with said control pulses, and means responsive to firing of said tube for releasing said link.

12. In an automatic telephone system, a plurality of lines, means including an impulse responsive link for routing a call from a calling one of said lines to a called one of said lines, said link comprising at least one string of impulse counting tubes, a control tube, means responsive to excitation of a predetermined one of said counting tubes for supplying control pulses to said control tube to fire the same, means for releasing said link in response to firing of said control tube, and a digit responsive circuit for preventing the firing of said control tube until a full digit of control pulses is transmitted to said link whereby said control tube is rendered ineffective to release said link if said predetermined counting tube is no longer excited at the end of a digit.

13. In an automatic telephone system, a plurality of lines, means including an impulse responsive link for routing a call from a calling one of said lines to a called one of said lines, means for deriving from said link control pulses indicative of the dialing of a first digit of predetermined designation, means for deriving from said link a control potential having a first value during the dialing of said first digit and having a second value after dialing of the first digit is completed, a control tube, means operative when said control potential has said second value for unblocking said device to permit firing thereof in accordance with said control pulses, and means responsive to firing of said tube for rendering said link ineffective to route the call to said called line in response to the transmission of said predetermined digit to said link.

14. In an automatic telephone system, a plurality of lines, means including an impulse responsive link for routing a call from a calling one of said lines to a called one of said lines, said link including at least one string of impulse counting tubes and means for rendering the tubes of said string sequentially conductive at the rate of one such tube for each impulse of a dialed digit, means responsive to continuous conduction of a predetermined one of the tubes of said string for developing a control signal, and digit cancelling means responsive to said control signal for rendering the link ineffective to set up connections between said calling line and a called one of said lines.

15. In an automatic telephone system, a plurality of lines, means including an impulse responsive link for routing a call from a calling one of said lines to a called one of said lines, said link including at least one string of impulse counting tubes and means for rendering the tubes of said string sequentially conductive at the rate of one such tube for each impulse of a dialed digit, means responsive to conduction of one of the tubes of said string for developing a periodic control signal, means responsive to the termination of a dialed digit for developing a control potential, and digit cancelling means responsive to the simultaneous occurrence of said control signal and said control potential for rendering said link ineffective to route the call to the called line.

16. In an automatic telephone system, a plurality of lines, means including an impulse responsive link for routing a call from a calling one of said lines to a called one of said lines, means responsive to the transmission to said link of a predetermined impulse of a dialed digit for developing a first control signal, means responsive to the completion of the dialed digit for developing a second control signal, and coincidence means responsive to the simultaneous occurrence of said first and second control signals for rendering said link ineffective for further use in completing the call in progress.

17. In an automatic telephone system, a plurality of lines, means including an impulse responsive link for routing a call from a calling one of said lines to a called one of said lines, means responsive to the transmission to said link of the first impulse of a dialed digit for developing a first control signal, means responsive to the transmission to said link of a second impulse of the same digit for disabling said last named means, means responsive to the completion of the dialed digit for developing a second control signal, and coincidence means responsive to the simultaneous occurrence of said first and second control signals for rendering said link ineffective for further use in completing the call in progress.

18. In an automatic telephone system, a plurality of lines, means including an impulse responsive link for routing a call from a calling one of said lines to a called one of said lines, said link including at least one string of impulse counting tubes and means for rendering the tubes of said string sequentially conductive at the rate of one tube for each impulse of a dialed digit, means responsive to conduction of one of the tubes of said string for developing a control pulse wavetrain, means responsive to completion of a dialed digit for developing a control potential, a control tube, means for impressing both said control pulse wavetrain and said control potential upon the control grid of said control tube, means for impressing a bias potential on said control grid of sufficient magnitude to prevent current flow through said control tube in response to either said control pulse wavetrain or said control potential but small enough to permit current flow through said tube when said control pulse wavetrain and control potential are coincidentally produced, and means responsive to current flow through said control tube for rendering said link ineffective for further use in completing the call in progress.

19. In an automatic telephone system, a plurality of lines, means including an impulse responsive link for routing a call from a calling one of said lines to a called one of said lines, said link including at least one string of impulse counting tubes and means for rendering the tubes of said string sequentially conductive at the rate of one tube for each impulse of a dialed digit, means responsive to conduction of one of the tubes of said string for developing a control pulse wavetrain, means responsive to completion of a dialed digit for developing a control potential, a control tube, means for impressing said control pulse wavetrain upon the control grid of said control tube, means for impressing a bias potential on said control grid of sufficient magnitude to prevent current flow through said control tube due to said control pulse wavetrain, means for impressing said control potential upon said control grid in opposition to said bias potential, thereby to permit said control pulse wavetrain to cause current flow through said control tube, and means responsive to current flow through said control tube for rendering said link ineffective for further use in completing the call in progress.

20. In an automatic telephone system, a plurality of lines, means for setting up a connection between a calling one of said lines and a called one of said lines, means for developing a first control signal in response to the transmission of a predetermined number of call directing impulses over a calling one of said lines, means for developing a second control signal upon completion of said call directing impulses, and means jointly responsive to said first and second control signals for preventing a connection from being set up between said calling line and a called one of said lines.

21. In an automatic signalling system of the pulse multiplex type having a plurality of lines over which subscriber controlled signals are transmitted, said lines having individually assigned thereto different time positions in repetitive time position frames, means responsive to the initiation of a call on one of said lines for developing pulses in the time position assigned to said calling line, connecting means responsive to said calling line pulses and directively controllable in accordance with operator produced signals transmitted over said calling line for extending a signalling connection from said calling line to a called one of said lines, means including impulse counting means for developing a periodic control signal in response to the transmission of a predetermined operator produced signal over said calling line, and means responsive to said control signal for absorbing said predetermined operator produced signal and preventing said connecting means from extending the signalling connection between said calling line and a called one of said lines in response to said predetermined operator produced signal.

22. In an automatic signalling system of the pulse multiplex type having a plurality of lines over which subscriber controlled signals are transmitted, said lines having individually assigned thereto different time positions in repetitive time position frames, means responsive to the initiation of a call on one of said lines for developing pulses in the time position assigned to said calling line, means for modulating said calling line pulses in accordance with call directing impulses transmitted over said calling line, connecting means responsive to call directing impulse modulation of said calling line pulses for extending a signalling connection from said calling line to a called one of said lines, means including impulse counting means for developing a periodic control signal in response to the transmission of a predetermined operator produced signal over said calling line, and means responsive to said control signal for absorbing said predetermined operator produced signal and preventing said connecting means from extending the signalling connection between said calling line and a called one of said lines in response to said predetermined operator produced signal.

23. In an automatic signalling system, a plurality of lines over which operator controlled information is transmitted, a plurality of directively controllable links operative in response to the transmission of operator produced signals over calling ones of said lines, means including said links for extending signalling connections from calling ones of said lines to called ones of said lines, each of said links consisting exclusively of electron valves and static circuit components, and signal cancelling means controlled by certain valves of said links for preventing said links from extending signalling connections between said lines in response to the transmission of a predetermined operator produced signal thereto.

24. In an automatic telephone system, a plurality of lines over which subscriber controlled information is transmitted, a plurality of impulse responsive links, means for operatively associating said links with calling lines of the system, said last named means including a plurality of electron valves through which subscriber information is transmitted from calling lines to the links operatively associated therewith, means including said links and directively controllable in accordance with subscriber information transmitted through said valves for extending telephonic connections from calling ones of said lines to called ones of said lines, each of said links including at least one string of impulse counting valves, and digit cancelling means in each link and controlled by one of the valves of said string upon the completion of a predetermined digit for preventing the link from extending a telephonic connection in response to the transmission of said predetermined digit thereto.

References Cited in the file of this patent

UNITED STATES PATENTS

| Number | Name | Date |
| --- | --- | --- |
| 1,530,968 | Williams | Mar. 24, 1925 |
| 2,506,612 | Ransom | May 9, 1950 |